United States Patent [19]
Paling et al.

[11] Patent No.: US 6,168,316 B1
[45] Date of Patent: Jan. 2, 2001

[54] BEARING ASSEMBLY FOR USE WITH WATER PUMPS

[75] Inventors: Neil Darren Paling, Newark; Andrew Macalpine Marshall, Chilwell, both of (GB); Nobuhiko Miyake, Fujisawa (JP)

[73] Assignee: NSK-RHP European Technology Co., Limited (GB)

[*] Notice: Under 35 U.S.C. 154(b), the term of this patent shall be extended for 0 days.

[21] Appl. No.: 09/378,822

[22] Filed: Aug. 23, 1999

[30] Foreign Application Priority Data

Aug. 27, 1998 (GB) .................................. 9818752

[51] Int. Cl.[7] ........................................ F16C 19/28
[52] U.S. Cl. ...................... 384/490; 384/512; 384/523; 384/547
[58] Field of Search .................... 384/490, 512, 384/523, 504, 547

[56] References Cited

U.S. PATENT DOCUMENTS 5,226,737   7/1993   Sandy, Jr. .

FOREIGN PATENT DOCUMENTS

| 0328496 | 8/1989 | (EP) . |
| 0586776 | 3/1994 | (EP) . |
| 2088480 | 6/1982 | (GB) . |

*Primary Examiner*—Lenard A. Footland
(74) *Attorney, Agent, or Firm*—Samuels, Gauthier & Stevens

[57] ABSTRACT

A rotary bearing assembly (10) for a motor vehicle water pump employs a spindle (11) with a central region (14) surrounded by an outer bearing ring (15). The ring (15) and spindle central region (14) have axially spaced complementary raceways (16, 17) on their confronting surfaces in angular contact with sets of balls (18). The spindle central region (14) adjoins one end region (12) with the same diameter as the central region and an opposite end region (13) of smaller diameter. The end region (12) is driven by a belt-and-pulley of the vehicle engine while the smaller end region (13) drives an impeller of the water pump. The set of balls (18) adjacent the driven end region (12) has a full complement of balls (18) in mutual contact while the smaller diameter end region (13) has the balls spaced apart with a cage (22).

4 Claims, 1 Drawing Sheet

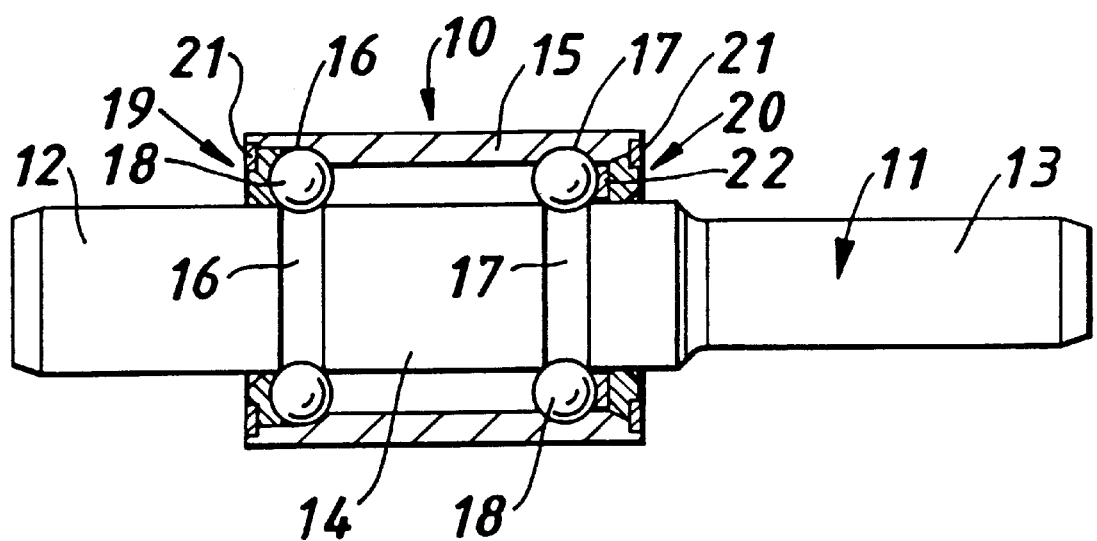

BEARING ASSEMBLY FOR USE WITH WATER PUMPS

FIELD OF THE INVENTION

The present invention relates to a bearing assembly for use with water pumps, particularly water pumps of internal combustion engines.

BACKGROUND OF THE INVENTION

A known form of bearing assembly is composed of a shaft or spindle extending through a bearing ring in which the spindle and the bearing ring have complementary axially-spaced raceways in which there are sets of rolling elements, typically balls, in angular contact with the raceways providing a double-row bearing. The rolling elements of the bearings are all spaced apart with cages so that the two bearings are identical. During use, when the spindle is driven by a belt-and-pulley to rotate and drive a water pump, the drive input bearing associated with the belt and pulley tends to experience high load and excessive temperature and bearing failure can occur.

An object of the invention is to provide an improved bearing assembly.

SUMMARY OF THE INVENTION

According to the invention there is provided a rotary bearing assembly for use with a motor vehicle water pump; said assembly comprising:

a shaft or spindle extending axially through a ring, the inner periphery of the ring and the outer peripheral region of the spindle within the ring being provided with a pair of spaced apart complementary rolling-element contacting raceways or tracks containing rows of rolling-elements (balls or rollers) in rolling contact with the raceways, wherein one row of rolling elements and raceways constituting a first rotary bearing has the balls arranged as a full complement with the rolling elements in contact with one another and the other row of rolling elements and raceways constituting a second rotary bearing has the balls spaced apart with a cage.

The first bearing is intended to be used as the drive input of the spindle and the second bearing is then used on the driven output of the spindle. In use, the drive input to the spindle is provided by a belt-and-pulley and the drive output for the spindle is coupled to an impeller which is part of a pump.

The invention may be understood more readily, and various other aspects of the features of the invention may become apparent, from consideration of the following description.

BRIEF DESCRIPTION OF THE DRAWINGS

An embodiment of the invention will now be described, by way of example only, with reference to the accompanying drawing, which is part sectional side view of a bearing assembly constructed in accordance with the invention.

DESCRIPTION OF PREFERRED EMBODIMENT

As shown in the drawing, a bearing assembly 10 constructed in accordance with the invention is composed of a shaft or spindle 11 having one free end region 12 of larger diameter than another free end region 13. The larger end region 12 is intended to be driven particularly by means of a belt-and-pulley (not shown) of an internal combustion engine. The smaller end region 13 is intended to be drivably coupled to an impeller of the water pump.

Between the end regions 12, 13 the spindle 11 has an intermediate region 14 which may have the same diameter as the drive end region 12. The intermediate region 14 of the spindle 11 is surrounded by an outer bearing ring 15. The inner periphery of the ring 15 and the outer periphery of the region 14 are provided with complementary raceways or tracks 16, 17 spaced apart at least by the diameter of the region 14. The raceways 16, 17 are in angular contact with rolling elements in the form of balls 18. The raceways 16 and the balls constitute a first rotary bearing 19 of the drive end of the spindle 11 and the raceways 17 and balls 18 constitute a second rotary bearing 20 at the driven end of the spindle 11.

In accordance with the invention, the first bearing 19 has a full complement of balls 18 in contact with one another, whilst the second bearing 20 has the balls 18 spaced apart with a cage 22. Seals 21 are provided between the ends of the ring 15 and the spindle 11.

In contrast to a conventional double-row angular contact ball bearing assembly where both bearings would have a cage, the bearing assembly 10 constructed in accordance with the invention has the drive end bearing 19 with a full complement of balls 18 filling the raceways 16. It has been found that such a bearing assembly 10 has an operational life considerably greater (typically by a factor of three times) than that of the conventional bearing assembly.

We claim:

1. A rotary bearing assembly for use with a motor vehicle water pump; said assembly comprising:

a shaft or spindle extending axially through a ring, the inner periphery of the ring and the outer periphery region of the spindle within the ring being provided with a pair of spaced apart complementary ball contacting raceways containing rows of balls in rolling contact with the raceways, wherein one row of balls and raceways constituting a first rotary bearing has the balls arranged as a full complement with the balls in contact with one another and the other row of balls and raceways constituting a second rotary bearing has the balls spaced apart with a cage.

2. A bearing assembly according to claim 1, wherein the balls are in angular contact with the raceways.

3. A bearing assembly according to claim 1, wherein the first bearing is intended for use at the drive input of the spindle and the second bearing is intended for use at the drive output of the spindle.

4. A bearing assembly according to claim 3, wherein the shaft or spindle has a central region within the ring and provided with the raceways and the central region adjoins one end region adjacent the first bearing which receives the drive input and another end region adjacent the second bearing which is of small diameter than the central region.

* * * * *